(12) United States Patent
Linet et al.

(10) Patent No.: US 11,237,862 B2
(45) Date of Patent: Feb. 1, 2022

(54) VIRTUALIZED NETWORK FUNCTION DEPLOYMENT

(71) Applicant: British Telecommunications Public Limited Company, London (GB)

(72) Inventors: Anne Linet, London (GB); Gilbert Owusu, London (GB); Carla Di Cairano-Gilfedder, London (GB); David Lesaint, London (GB); Pierre Desport, London (GB); Frederic Lardeux, London (GB)

(73) Assignee: British Telecommunications Public Limited Company, London (GB)

( * ) Notice: Subject to any disclaimer, the term of this patent is extended or adjusted under 35 U.S.C. 154(b) by 121 days.

(21) Appl. No.: 16/497,581

(22) PCT Filed: Mar. 26, 2018

(86) PCT No.: PCT/EP2018/057684
§ 371 (c)(1),
(2) Date: Sep. 25, 2019

(87) PCT Pub. No.: WO2018/178033
PCT Pub. Date: Oct. 4, 2018

(65) Prior Publication Data
US 2021/0103456 A1    Apr. 8, 2021

(30) Foreign Application Priority Data
Mar. 27, 2017 (EP) ..................................... 17163171

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/4557* (2013.01); *G06F 2009/45595* (2013.01)

(58) Field of Classification Search
CPC .................................................... G06F 9/45558
(Continued)

(56) References Cited

U.S. PATENT DOCUMENTS 9,430,262 B1 *  8/2016  Felstaine ................. H04L 67/16
9,979,602 B1 *  5/2018  Chinnakannan ........ H04L 47/82
(Continued)

FOREIGN PATENT DOCUMENTS

EP          2849064 A1     3/2015
WO     WO-2017016758 A1     2/2017

OTHER PUBLICATIONS

Wang Xiaoke et al.: "Online VNF Scaling in Datacenters", 2016 IEEE 9th International Conference On Cloud Computing (CLOUD), IEEE, Jun. 27, 2016 (Jun. 27, 2016), pp. 140-147 (Year: 2016).*
(Continued)

*Primary Examiner* — Mehran Kamran
(74) *Attorney, Agent, or Firm* — Patterson Thuente Pedersen, P.A.

(57) ABSTRACT

A method for deploying virtualized network functions (VNFs) as virtualized implementations of logical network devices in a virtualized computing environment for providing network services, the method including determining a VNF deployment plan including a specification, for each point in time over a planning period, of zero or more VNF instances to be released at the point in time and zero or more VNF instances to be deployed at the point in time, wherein the deployment plan is determined by an optimization function based on: a constraint on a number of VNFs in all states of undeployed, being deployed, deployed and being (Continued)

release; constraints based on a demand for VNFs defined by characteristics of the VNFs and the virtualized computing environment; and constraints based on a capacity of the virtualized computing environment to accommodate a resource consumption of the VNFs, and wherein the optimization function is configured to minimize one or more of: a number of VNFs in a deployed state; and a resource cost of deploying and releasing VNFs; and executing the VNF deployment plan to deploy VNFs for the virtualized computing environment.

8 Claims, 2 Drawing Sheets

(58) Field of Classification Search
USPC .............................................................. 718/1
See application file for complete search history.

(56) References Cited

U.S. PATENT DOCUMENTS

| | | | | |
|---|---|---|---|---|
| 10,785,109 | B1* | 9/2020 | Sidebottom | H04L 67/16 |
| 2015/0082308 | A1 | 3/2015 | Kiess et al. | |
| 2015/0358248 | A1* | 12/2015 | Saha | H04L 41/5096 709/226 |
| 2016/0043944 | A1* | 2/2016 | Felstaine | H04L 47/12 370/389 |
| 2016/0119189 | A1* | 4/2016 | Choi | H04L 41/12 709/223 |
| 2016/0269232 | A1* | 9/2016 | Hikichi | H04L 41/5041 |
| 2017/0142206 | A1* | 5/2017 | Kodaypak | H04L 67/10 |
| 2017/0214608 | A1* | 7/2017 | Jilani | H04L 47/35 |
| 2017/0237647 | A1* | 8/2017 | N | G06F 9/45558 709/224 |
| 2017/0371692 | A1* | 12/2017 | Connolly | G06F 9/45558 |
| 2018/0091395 | A1* | 3/2018 | Shinohara | G06F 9/45558 |
| 2018/0191581 | A1* | 7/2018 | Yu | H04L 41/5041 |
| 2018/0204234 | A1* | 7/2018 | Hermoni | G06Q 10/06 |
| 2018/0205786 | A1* | 7/2018 | Dong | H04L 67/10 |
| 2018/0316559 | A1* | 11/2018 | Thulasi | H04L 41/5041 |
| 2018/0329758 | A1* | 11/2018 | Zhu | G06F 9/455 |
| 2019/0109756 | A1* | 4/2019 | Abu Lebdeh | G06F 9/5077 |
| 2019/0287146 | A1* | 9/2019 | Maitland | H04L 41/12 |
| 2019/0288914 | A1* | 9/2019 | Celozzi | G06F 9/45558 |

OTHER PUBLICATIONS

Bari F., et al., "Orchestrating Virtualized Network Functions," IEEE Transactions on Network and Service Management, XP011636366, vol. 13, No. 4, Dec. 1, 2016, 14 pages.
Bouet M., et al., "Cost-Based Placement of vDPI Functions in NFV Infrastructures," Proceedings of the 2015 1st IEEE Conference on Network Softwarization, XP032782113, 2015, 9 pages.
Combined search and Examination Report for Great Britain Application No. 1704866.1, dated Aug. 25, 2017, 6 pages.
Extended European Search Report for Application No. 17163171.6, dated Sep. 19, 2017, 10 pages.
International Preliminary Reporton Patentability for Application No. PCT/EP2018/057684, dated Oct. 10, 2019, 7 pages.
International Search Report and Written Opinion for Application No. PCT/EP2018/057684, dated Jun. 5, 2018, 9 pages.
Non final Office Action For U.S. Appl. No. 16/497,581, dated May 14, 2021, 19 pages.
Telefonica, "Why Distribution Matters in NFV," Strategic White Paper, Telefonica & Alcatel-Lucent, Collaborative white paper between Alcatel-lucent and Telefonica, 2014, downloadedfrom https://www.tmcnet.com/tmc/whitepapers/documents/whitepapers/2014/10462-why-distribution-matters-nfv.pdf, 12 pages.
Yousaf F.Z., et al., "Cost Analysis of Initial Deployment Strategies for Virtualized Mobile Core Network Functions," IEEE Communications Magazine, XP011593682, vol. 53, No. 12, Dec. 2015, pp. 60-66.

* cited by examiner

VIRTUALIZED NETWORK FUNCTION DEPLOYMENT

CROSS-REFERENCE TO RELATED APPLICATIONS

The present application is a National Phase entry of PCT Application No. PCT/EP2018/057684, filed Mar. 26, 2018, which claims priority from European Patent Application No. 17163171.6 filed Mar. 27, 2017, each of which is fully incorporated herein by reference.

TECHNICAL FIELD

The present disclosure relates to the deployment of functions for computer networks and, in particular, the deployment of virtualized network functions.

BACKGROUND

Network function virtualization (NFV) is the application of systems virtualization to computer network functions such as: deep packet inspection; network optimization; radio network access; and content delivery functions. This means that physical bespoke appliances are replaced with software equivalents operating in servers such as cloud computing devices. Virtualizing these appliances in this way permits: their provision by potentially many disparate service providers; their provision potentially remotely with access via the cloud service provider; network-wide deployment of new or alternate appliances in one go; modifying, updating or fixing appliances by software change without a need to invest in new hardware; a decoupling of software management from hardware management such that the physical devices can be managed, upgraded and provisioned separately from the software that can be managed remotely; and control over the scale, nature and extent of appliances deployed in a network centrally and potentially network-wide. A motivator for the use of NFV is a reduction in energy consumption with NFV offering up to 50% energy savings versus equivalent physical appliance deployments.

Virtualized network functions are deployed for virtualized computer systems providing services requiring the network functions. For example, a firewall service may require the deployment of: a deep packet inspection function; and a routing function. These services and the functions they depend upon are provisioned, deployed and released over time according to the execution of the computer system. The NFV resources are therefore instantiated and released potentially repeatedly for each of potentially multiple services in a virtualized system. There is a resource cost associated with the deployment of duplicate functions in a virtualized system. Further, there is a resource and time cost associated with provisioning and deprovisioning functions according to the needs of the services.

SUMMARY

It would be advantageous to provide NFV while mitigating and/or reducing these resource costs.

The present disclosure accordingly provides, in a first aspect, a method for deploying virtualized network functions (VNFs) as virtualized implementations of logical network devices in a virtualized computing environment for providing network services, the method comprising: determining a VNF deployment plan including a specification, for each point in time over a planning period, of zero or more VNF instances to be released at the point in time and zero or more VNF instances to be deployed at the point in time, wherein the deployment plan is determined by an optimization function based on: a constraint on a number of VNFs in all states of undeployed, being deployed, deployed and being release; constraints based on a demand for VNFs defined by characteristics of the VNFs and the virtualized computing environment; and constraints based on a capacity of the virtualized computing environment to accommodate a resource consumption of the VNFs, and wherein the optimization function is configured to minimize one or more of: a number of VNFs in a deployed state; and a resource cost of deploying and releasing VNFs; and executing the VNF deployment plan to deploy VNFs for the virtualized computing environment.

In some embodiments deployed VNF instances are associated with a cluster of virtualized resources for providing network services.

In some embodiments undeployed VNF instances are associated with a virtual cluster of virtualized resources as a repository of resources suitable for deployment for providing network services.

In some embodiments the constraint on a number of VNFs in all states is determined to be a fixed number of VNFs across all states.

In some embodiments the characteristics of the VNFs and the virtualized computing environment include one or more of: an identification of which VNFs are required to provide each of a set of network services; an identification of a volume of requests for a network service at each point in time over the planning period; an indication of a proportion of requests for a network service handled by a VNF at each point in time over the planning period; an indication of a maximum number of requests for a service each VNF can handle per unit time in the planning period; an indication of an amount of computing resource consumed by each VNF per unit time in the planning period; an indication of an amount of resource available in a cluster of VNFs at each point in time over the planning period; an amount of time required for a deployment of an VNF for a service; and an amount of time required for a release of an VNF for a service.

In some embodiments any of: the identification of which VNFs are required to provide each of a set of network services; the identification of a volume of requests for a network service at each point in time over the planning period; and the indication of a proportion of requests for a network service handled by a VNF at each point in time over the planning period are determined based on empirical observation of VNFs in use for providing network services in the virtualized computing environment.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which.

DETAILED DESCRIPTION OF THE DRAWINGS

Figure 1:
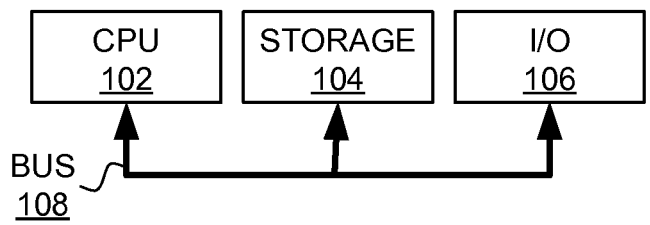
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
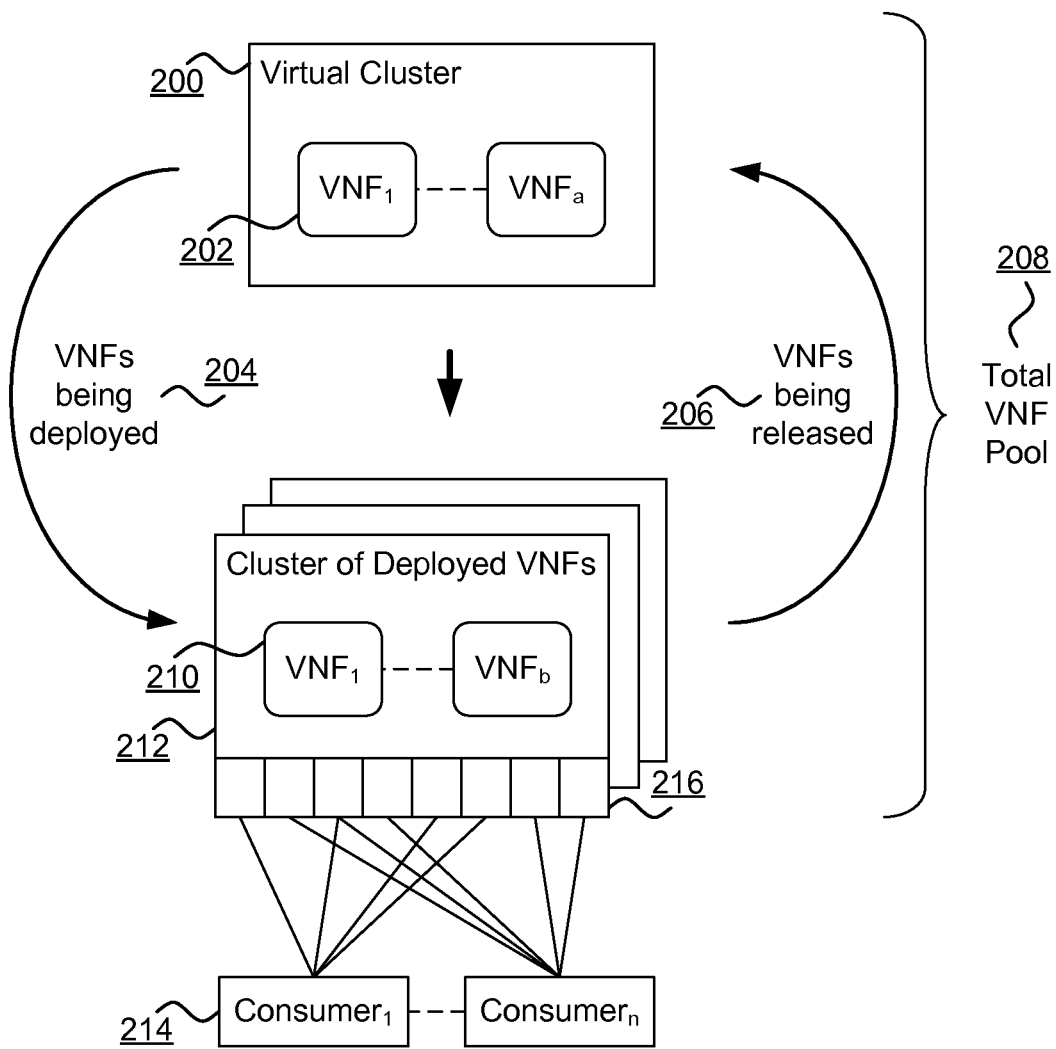
FIG. 2 is a schematic diagram illustrating a pool of virtualized network functions (VNFs) in a network function virtualization (NFV) system in accordance with embodiments of the present disclosure.

FIG. 2 is a schematic diagram illustrating a pool 208 of virtualized network functions (VNFs) in a network function virtualization (NFV) system in accordance with embodiments of the present disclosure. A set of VNFs constituting a pool of VNFs 208 are provided as virtualized implementations of logical network devices in one or more virtualized computing environments. Each VNF provides a network function such as a function that may previously be provided by a physical network device or appliance. Thus, each VNF has associated a type of network function such as: a network address translation function (NAT); a firewall function; a routing function; a load balancing function; an intrusion detection function; a deep packet inspection function; a wide area network acceleration function; a video stream or data optimization function; a content deliver function; or other virtualizable network functions as will be apparent to those skilled in the art.

The VNFs can be deployed and arranged to provide network services 216 such as are previously described. Further, multiple network services 216 constituted by VNFs can be arranged to provide service chains for one or more applications executing in or with a virtualized computing environment as chains of network services working together for the application(s). In accordance with embodiments of the present disclosure, a total VNF pool 208 has a fixed number of instantiated VNFs in that VNFs are instantiated virtual computing components such as virtual machines (VMs) or software applications executing in, with or on VMs. Each VNF operates in one of four modes of operation. In a first mode of operation a VNF is instantiated but undeployed and thus not employed in the provision of any network service 216. Such VNFs are situated logically in a "virtual cluster" 200 of VNFs 202. VNFs 202 in the virtual cluster 200 are suitable for deployment for use in a cluster 212 of virtualized computing resource for the provision of network services 216 to consumer entities 214. Thus, a second mode of operation of a VNF is "being deployed" 204 in which a VNF is actively being transitioned from an undeployed state in the virtual cluster 200 to a deployed state in a cluster 212 for providing network services 216 to one or more consumers 214. A third mode of operation of a VNF is accordingly a deployed state in which the VNF 210 is deployed to a cluster 212 for the provision of network services 216 to consumers 214. A fourth mode of operation of a VNF is a mode in which the VNF is "being released" 206 such that the VNF is being transitioned from a deployed state in a cluster 212 of deployed VNFs to the virtual cluster 200 of undeployed VNFs 202.

Consumers 214 are hardware, software, firmware or combination entities that may be physical or wholly or partly virtualized and that operate with one or more virtualized computing environments to access virtualized resources such as virtualized network services 216. For example, a consumer 214 can be a server computer system for providing a server application by consuming virtualized resource including virtualized network services 216.

Figure 3:
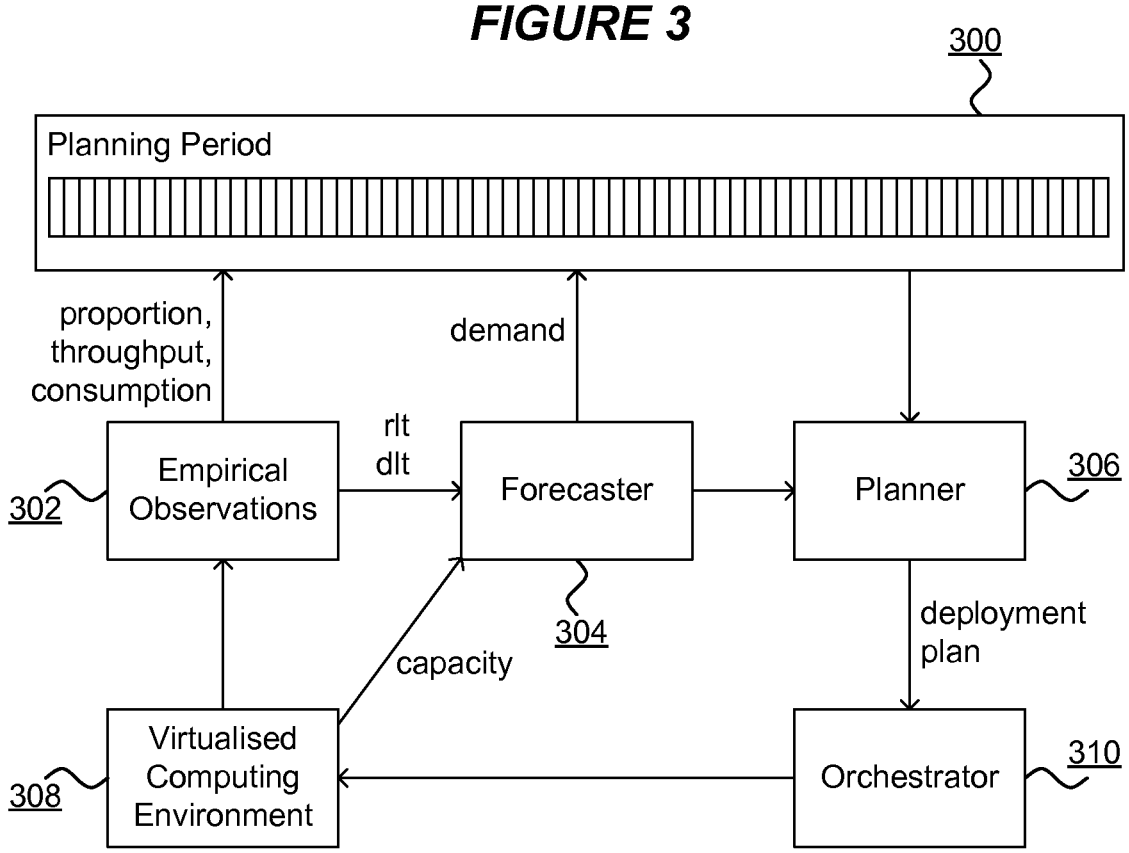
FIG. 3 is a component diagram of an exemplary arrangement of a VNF planning and execution system in accordance with embodiments of the present disclosure.

FIG. 3 is a component diagram of an exemplary arrangement of a VNF planning and execution system in accordance with embodiments of the present disclosure. A planner 306 is a hardware, software, firmware or combination component for determining a VNF deployment plan for execution by an orchestrator 310. The VNF deployment plan includes a specification, for each point in time over a planning period 300, of zero or more VNF instances to be released at the point in time and zero or more VNF instances to be deployed at the point in time. The orchestrator 310 is a hardware, software, firmware or combination component for executing the deployment plan by effecting the release and deployment of VNFs in a virtualized computing environment 308 according to the specifications of the plan. The virtualized computing environment 308 operates to provide the virtual cluster 200, the cluster(s) of deployed VNFs 212 and the virtualized network services 216 by way of the VNFs. Thus the virtualized computing environment 308 operates based on physical resources to provide the virtualized resources for each of these elements and may be collocated or distributed using one or more communications means such as wired or wireless computer networks.

The planner 306 is operable responsive to information associated with a model of the planning period 300—such as a data structure representation of the planning period including each point of time of the planning period or alternatively a simple numeric representation or indication of each point in time over the planning period. The planner 306 is further operable to obtain, receive or access characteristics of the VNFs in the pool 208 and of the virtualized computing environment 308. Such characteristics will now be described.

The planner 306 is operable in response to information generated by a forecaster 304 as a hardware, software, firmware or combination component adapted to forecast, for example, a demand for each VNF at each point in time or across a range of points in time in the planning period 300. Such a demand can be an identification of a volume of requests for a network service at each point in time over the planning period 300.

The planner 306 is operable to obtain an identification of which VNFs are required to provide each of a set of network services 216. Such information, known as "customization" information, can be obtained from a predetermined definition of VNFs required for services and/or from definitions stored or accessed by or via the virtualized computing environment 308.

The planner 306 is operable to obtain an indication of a proportion of requests for a network service handled by a VNF at each point in time over the planning period 300.

The planner 306 is operable to obtain an indication of a maximum number of requests for a service each VNF can handle per unit time in the planning period 300, known as a "throughput."

The planner 306 is operable to obtain an indication of an amount of computing resource consumed by each VNF per unit time in the planning period 300, known as "consumption."

The planner 306 is operable to obtain an indication of an amount of resource available in a cluster 212 of VNFs at each point in time over the planning period 300, known as "capacity."

The planner 306 is operable to obtain an amount of time required for a deployment of an VNF for a service 216, known as "rlt." Further, the planner 306 is operable to obtain an amount of time required for a release of an VNF for a service 216, known as "dlt."

Thus, in use, the planner determines a deployment plan for execution by the orchestrator 310. The deployment plan is determined using an optimization function configured to minimize one or more of: a number of VNFs in a deployed state; and a resource cost of deploying and releasing VNFs.

Figure 4:
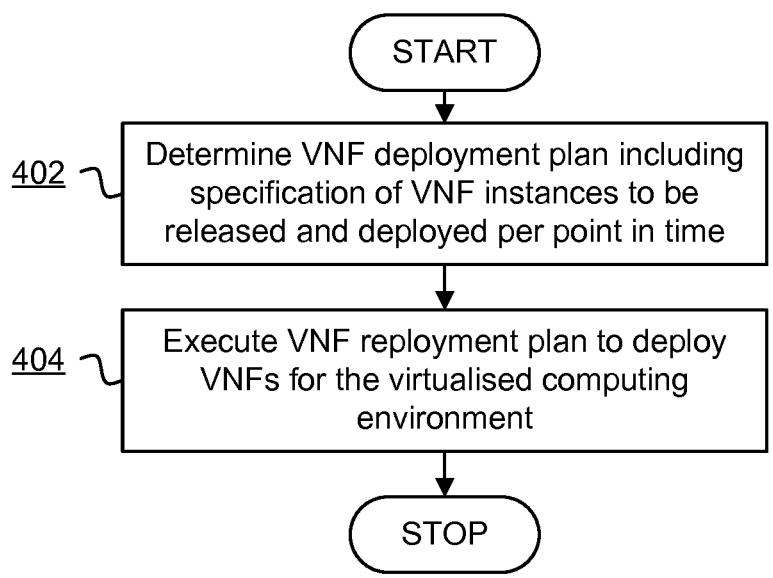
FIG. 4 is a flowchart of a method for deploying VNFs in a virtualized computing environment for providing network services in accordance with embodiments of the present disclosure.

FIG. 4 is a flowchart of a method for deploying VNFs in a virtualized computing environment 308 for providing network services in accordance with embodiments of the present disclosure. Initially, at 402, the method determines a VNF deployment plan including a specification, for each point in time over the planning period 300, of zero or more VNF instances to be released at the point in time and zero or more VNF instances to be deployed at the point in time. The deployment plan is determined by an optimization function based on: a constraint on a number of VNFs in all states of undeployed, being deployed, deployed and being release; constraints based on a demand for VNFs defined by the characteristics of the VNFs and the virtualized computing environment; and constraints based on a capacity of the virtualized computing environment 308 to accommodate a resource consumption of the VNFs. Subsequently, at 404, the VNF deployment plan is executed to deploy VNFs for the virtualized computing environment 308.

To efficiently deploy VNFs to achieve required network services 216 in a manner that minimizes VNF deployments and deployment/release overhead, algorithms are employed that optimally schedule the deployment and release of VNFs including a sequence of deployment and release within the pool 208 of all available VNFs. Embodiments of the present disclosure include a mechanism that seeks an optimal deployment according to the above described optimization objectives using an optimization function of the planner 306.

Input data, decision variables, constraints and objectives of the optimization function will now be described in detail by way of example only and all of the following description is purely exemplary and refers to one or more exemplary embodiments only.

Input Data for the Optimization Function

We consider the following sets of objects:
T denotes a planning period 300
The planning period 300 is discretized into time intervals of equal length called time buckets or points in time. In an embodiment, the length of each bucket is one second (in general the length of a time bucket can be smaller than lead times for deployment and release of VNFs);
All buckets have the same length which is the unit of time of the planning problem.
F denotes the set of all VNFs
An VNF is deployed in a cluster by the means of a hosted virtual machine implementing the VNF;
An VNF may have multiple instances running in a cluster;
VNFs constitute network functions required to provide each network service 216 and can be categorized as "baseline functions" or "additional functions" in respect of a service. Baseline functions constitute a minimum enabling set of VNFs to provide a service, while additional functions are add-on functions which may operate in conjunction with, or addition to, baseline functions and are optional for a service consumer. For example, an enhanced streaming service may have three component functions: routing, WAN acceleration, and deep packet inspection (DPI). The streaming service cannot operate without routing so that is defined as "enabling" the service and interpreted as a baseline function. WAN acceleration and DPI are both concerned with enhancing a quality of service that requires routing as an enabling function, so they are both considered additional functions for the service.
S denotes the set of services 216 offered by a service provider
A service 216 is logically specified as a set of VNFs which is specific to a cluster hosting the service 216;
A VNF may be required by different services 216 and therefore different instances of a VNF may be deployed for different services 216 in the same cluster;
In some embodiments, each VNF deployed in a cluster runs exclusively for a single service 216 until it is released (i.e., a VNF instance is not shared among services);
A VNF instance may be released at any point in time and then reconfigured (or not) before being redeployed (or not) in the same cluster or another cluster for the same service or another service.
C denotes the set of clusters of VNF instances
In addition to clusters for deployed VNFs for the provision of network services 216, a virtual cluster 200 contains any VNF instance that is not currently deployed;
In one embodiment, lead times for releasing an VNF instance or deploying an VNF instance can be assumed to be a function of measured delay and may depend on: the particular VNF itself; an origin cluster of the VNF; and/or a destination cluster of the VNF.
R denotes a set of computational resource types
Examples include RAM, disk space, CPU time, etc.
Each VNF instance consumes a certain amount of computational resources.
A forecast of service demand is generated. First a set of baseline VNFs $Y_{si}$ and additional VNFs $Y_{sj}$ are identified for each service type s in S. These can be maintained in a service/function mapping. Subsequently forecasts are produced by forecaster 304 for both types of NVF using empirical data received from actual service requests from service consumers and forecasts based on historic data.

A baseline demand forecast can be produced in terms of an estimated number of service requests in the planning period 300 (e.g. an average number of service requests per time unit). In an exemplary embodiment, the forecaster 304 operates on the basis of a single value based on average demand, although actual demand may vary over the period 300. The forecaster 304 can provide a forecast number of service requests which can be converted into requirements for physical resources of the virtualized computing environment 308.

Demand for the additional VNF set $Y_{sj}$ can also be determined. This demand can be met by means of functions instantiated at potentially different physical locations—e.g. with different virtualized computing environments—which can be identified by some clustering optimization. In an embodiment, the additional VNF demand can be expressed as a function of a baseline VNF demand, for example it may be expressed as a percentage $f_{sj}$ of a forecasted baseline demand.

Exemplary data structures will now be described for use by the optimization function of the planner 306. Many of the exemplary data structures are numeric multi-dimensional arrays whose index sets map to the above sets of objects.

A service 216 is associated with one or more VNFs based on a cluster 212 hosting the service 216. This mapping is modeled with a three-dimensional array of integers having values in $\{0,1\}$:

[D1] customization[s,f,c] in $\{0,1\}$ (s=1 ... |S|, f=1 ... |F|, c=1 ... |C|)

where customization[s,f,c]=1 if and only if service s requires at least one instance of VNF f running in cluster c.

The demand for a service 216 in a cluster 212 at each point in time is measured by the (actual and/or forecast) number of requests for the service 216 at that point in time. Demand can be modeled with a three-dimensional array of positive integers:

[D2] demand[s,c,t] in $\mathbb{N}$ (s=1 ... |S|, c=1 ... |C|, t=1 ... |T|)

where demand[s,c,t] denotes the number of requests for service s in cluster c during time bucket t. This function can be produced by the forecaster 304, such as based on historical demand, and may depend on other factors such as environment conditions (e.g. weather) and operational objectives (e.g. a requisite quality of service, QoS). $\mathbb{N}$ is the set of all natural numbers.

Part of a request for a service 216 can be processed by each VNF implementing the service 216. This proportion is constant per unit of time and specific to a service and VNF. This can be modeled with a matrix of percentages or proportions:

[D3] proportion[s,f] in [0,1] (s=1 ... |S|, f=1 ... |F|)

where proportion[s,f] denotes the proportion of requests for service s per unit of time that is handled by VNF f. This data allows specifying percentages of additional functionality as a function of baseline functionality as previously described.

A maximum number of requests an instance of a VNF for implementing a service 216 can process per unit of time can be fixed and specific to the service 216 and VNF being. This can be modeled with a matrix of integers:

[D4] throughput[s,f] in $\mathbb{N}$ (s=1 ... |S|, f=1 ... |F|)

where throughput[s,f] denotes a maximum number of requests an instance of VNF f can process for service s per unit of time.

An instance of a VNF consumes computational resources in a cluster 212 it is deployed to. The amount of a resource capacity consumed per unit of time can be fixed for each VNF and type of computational resource. This can be modeled with a matrix of positive integers:

[D5] consumption[f,r] in $\mathbb{N}$ (f=1 ... |F|, r=1 ... |R|)

where consumption[f,r] denotes the amount of capacity of resource type r consumed by an instance of VNF f per unit of time.

A capacity of a cluster 212 can be measured for each type of computational resource and may vary over time. Capacity can be modeled with a three-dimensional array of positive integers:

[D6] capacity[r,c,t] in $\mathbb{N}$ (r=1 ... |R|, c=1 ... |C|, t=1 ... |T|)

where capacity[r,c,t] denotes the amount of capacity of resource type r available in cluster c at time t.

A total number of VNF instances is constant over time although a distribution of instances across services, clusters (including the virtual cluster) and modes of operation may vary over time:

[D7] pool in $\mathbb{N}$ $\{>0\}$

Lead times for releasing or deploying an instance of a VNF depend on:

[D8] rlt[f,s,c,d] in $\mathbb{N}$ (f=1 ... |F|, s=1 ... |S|, c=1 ... |C|, d>0)

[D9] dlt[f,s,c,d] in $\mathbb{N}$ (f=1 ... |F|, s=1 ... |S|, c=1 ... |C|, d>0)

where rlt (and, respectively, dlt) denotes the lead time for shutting down and releasing (respectively, configuring and deploying) a VNF instance and depend on VNF, service 216, cluster 212, and on a function of delay d (e.g. an average end-to-end delay experienced historically by physical resources in c).

Thus, in use, the planner 306 generates a deployment plan specifying, at each point in time of the planning period 300, which VNF instance to release (and preferably where from) and which VNF instance to deploy (and preferably to where) based on actual and forecast demand for services 216 across clusters 212 and subject to computational resources available in clusters 212.

In an exemplary embodiment, this planning problem can be formalized as a mixed integer program by means of decision variables and constraints. Solutions to this problem (i.e. an assignment of the variables satisfying the constraints) correspond to a feasible deployment plan for execution by the orchestrator 310.

Decision Variables for the Optimization Function

A number of VNF instances placed in a cluster 212 at a given time bucket is determined. This can be modeled with a vector of positive integer variables:

[V1] x[t] ranges over $\mathbb{N}$ (t=1 ... |T|)

where x[t] denotes the number of VNF instances in the virtual cluster (i.e., after being released and before being deployed) at time t.

A number of instances of a VNF deployed for a service 216 in a cluster 212 at a given time bucket is determined. This can be modeled with a four-dimensional array of positive integer variables:

[V2] x[f,s,c,t] ranges over $\mathbb{N}$ (f=1 ... |F|, s=1 ... |S|, c=1 ... |C|, t=1 ... |T|)

where x[f,s,c,t] denotes a number of instances of VNF f used for service s in cluster c at time t.

A number of instances of a VNF to deploy in a cluster 212 for a service 216 at a given time bucket is determined. This can be modeled with a four-dimensional array of positive integer variables:

[V3] deploy[f,s,c,t] ranges over $\mathbb{N}$ (f=1 ... |F|, s=1 ... |S|, c=1 ... |C|, t=1−dlt[f,s,c,d] ... |T|)

where deploy[f,s,c,t] denotes a number of instances of VNF f whose deployment is initiated at time t for service s in cluster c and completes at time t+dlt[f,s,c,d].

Similarly, a number of instances of a VNF to release from a cluster 212 for a service 216 at a given time bucket is determined. This can be modeled with a four-dimensional array of positive integer variables:

[V4] release[f,s,c,t] ranges over $\mathbb{N}$ (f=1 ... |F|, s=1 ... |S|, c=1 ... |C|, t=1−rlt[f,s,c,d] ... |T|)

where release[f,s,c,t] denotes a number of instances of VNF f whose release is initiated at time t for service s in cluster c and completes at time t+rlt[f,s,c,d].

Constraints for the Optimization Function

The initial distribution of the VNF instances (at time bucket 1) and the releases or deployments initiated before bucket 1 are known from:

[C1] x[1]=v for some v in $\mathbb{N}$,

[C2] for f=1 ... |F|, s=1 ... |S|, c=1 ... |C|, x[f,s,c,1]=v for some v in $\mathbb{N}$

[C3] for f=1 ... |F|, s=1 ... |S|, c=1 ... |C|, t=1 ... rlt[f,s,c,d], release[f,s,c,t−rlt[f,s,c,d]]=v for some v in $\mathbb{N}$

[C4] for f=1 ... |F|, s=1 ... |S|, c=1 ... |C|, t=1 ... dlt[f,s,c,d], deploy[f,s,c,t−dlt[f,s,c,d]]=v for some v in $\mathbb{N}$ Flow constraints with lead-times govern release and deployment of VNF instances:

[C5] for t=2 ... |T|,
x[t]=x[t−1]+SUM(f=1 ... |F|, s=1 ... |S|, c=1 ... |C|) (release[f,s,c,t−rlt[f,s,c]]−deploy[f,s,c,t])

[C6] for f=1 ... |F|, s=1 ... |S|, c=1 ... |C|, t=2 ... |T|, x[f,s,c,t]=x[f,s,c,t−1]+deploy[f,s,c,t−dlt[f,s,c]]−release[f,s,c,t]

Note: the function SUM operates as a summation operation $\Sigma$ including a definition of the variable ranges over which the summation is to be performed such that SUM(a, b)(fn) sums fn over all ranges a and b.

The pool 208 of VNF instances is constant over time, thus:

[C7] for t=1 ... |T|,
pool=x[t]
+SUM(f=1 ... |F|, s=1 ... |S|, c=1 ... |C|)(x[f,s,c,t])
+SUM(f=1 ... |F|, s=1 ... |S|, c=1 ... |C|, t'=t−rlt[f,s,c,d]+1 ... t)(release[f,s,c,t'])
+SUM(f=1 ... |F|, s=1 ... |S|, c=1 ... |C|, t'=t−dlt[f,s,c,d]+1 ... t)(deploy[f,s,c,t'])

A demand for a service 216 in a cluster 212 over each time bucket determines a lower bound on a number of running instances required for each type of VNF implementing the service 216:

[C8] for s=1 ... |S|, f=1 ... |F|, c=1 ... |C|, t=1 ... |T|, customization[s,f,c]*demand[s,c,t]*proportion[s,f]<=x[f,s,c,t]*throughput[s,f]

A capacity of a cluster 212 over each time bucket for each type of computational resource must be greater than or equal to the total consumption resulting from running VNF instances:

[C9] for r=1 ... |R|, c=1 ... |C|, t=1 ... |T|,
SUM(s=1 ... |S|, f=1 ... |F|) x[f,s,c,t]*consumption[f,r]<=capacity[r,c,t]

Objectives for the Optimization Function

In an embodiment, the optimization process of the planner 306 seeks to identify a sequence of instantiation and releases of VNFs so as to minimize one of the following objectives or minimize a combination of them using a weighted function:

A first objective is to minimize a number of VNF instances:

[O1] minimize SUM(f=1 ... |F|, s=1 ... |S|, c=1 ... |C|) (x[f,s,c,t])

A second objective is to minimize VNF release and deployment resource costs:

[O2] minimize SUM(f=1 ... |F|, s=1 ... |S|, c=1 ... |C|, t=2 ... |T|)(rd_cost*(x[t]−x[t−1]))

where rd_cost in $\mathbb{N}$ denotes the unitary cost of any release or deployment of a virtual function instance.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the disclosure.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method for deploying virtualized network functions (VNFs) as virtualized implementations of logical network devices in a virtualized computing environment for providing network services, the method comprising:

determining a VNF deployment plan including a specification, for each point in time over a planning period, of zero or more VNF instances to be released at the point in time and zero or more VNF instances to be deployed at the point in time, wherein the deployment plan is determined by an optimization function based on: a constraint on a number of VNFs in all states of undeployed, being deployed, deployed, and being released, wherein a VNF in the being deployed state is actively transitioned from the undeployed state to the deployed state; constraints based on a demand for VNFs defined by characteristics of the VNFs and the virtualized computing environment; and constraints based on a capacity of the virtualized computing environment to accommodate a resource consumption of the VNFs, and wherein the optimization function is configured to minimize one or more of: a number of VNFs in a deployed state; or a resource cost of deploying and releasing VNFs; and executing the VNF deployment plan to deploy VNFs for the virtualized computing environment.

2. The method of claim 1, wherein deployed VNF instances are associated with a cluster of virtualized resources for providing network services.

3. The method of claim 2, wherein undeployed VNF instances are associated with a virtual cluster of virtualized resources as a repository of resources suitable for deployment for providing network services.

4. The method of claim 1, wherein the constraint on a number of VNFs in all states is determined to be a fixed number of VNFs across all states.

5. The method of claim 1, wherein the characteristics of the VNFs and the virtualized computing environment include one or more of: an identification of which VNFs are required to provide each of a set of network services; an identification of a volume of requests for a network service at each point in time over the planning period; an indication of a proportion of requests for a network service handled by a VNF at each point in time over the planning period; an indication of a maximum number of requests for a service each VNF can handle per unit time in the planning period; an indication of an amount of computing resource consumed by each VNF per unit time in the planning period; an indication of an amount of resource available in a cluster of VNFs at each point in time over the planning period; an amount of time required for a deployment of an VNF for a service; or an amount of time required for a release of an VNF for a service.

6. The method of claim 5, wherein any of: the identification of which VNFs are required to provide each of a set of network services; the identification of a volume of requests for a network service at each point in time over the planning period; or the indication of a proportion of requests for a network service handled by a VNF at each point in time over the planning period, are determined based on empirical observation of VNFs in use for providing network services in the virtualized computing environment.

7. A computer system comprising:

a processor and memory storing computer program code for deploying virtualized network functions (VNFs) as virtualized implementations of logical network devices in a virtualized computing environment for providing network services, by:

determining a VNF deployment plan including a specification, for each point in time over a planning period, of zero or more VNF instances to be released at the point in time and zero or more VNF instances to be deployed at the point in time, wherein the deployment plan is determined by an optimization function based on: a constraint on a number of VNFs in all states of undeployed, being deployed, deployed, and being released, wherein a VNF in the being deployed state is actively transitioned from the undeployed state to the deployed state; constraints based on a demand for VNFs defined by characteristics of the VNFs and the virtualized computing environment; and constraints based on a capacity of the virtualized computing environment to accommodate a resource consumption of the VNFs, and wherein the optimization function is configured to minimize one or more of: a number of VNFs in a deployed state; or a resource cost of deploying and releasing VNFs; and executing the VNF deployment plan to deploy VNFs for the virtualized computing environment.

8. A non-transitory computer-readable storage medium storing a computer program element comprising computer program code to, when loaded into a computer system and executed thereon, cause the computer system to perform the method as claimed in claim 1.

* * * * *

UNITED STATES PATENT AND TRADEMARK OFFICE
CERTIFICATE OF CORRECTION

| | |
|---|---|
| PATENT NO. | : 11,237,862 B2 |
| APPLICATION NO. | : 16/497581 |
| DATED | : February 1, 2022 |
| INVENTOR(S) | : Anne Liret |

It is certified that error appears in the above-identified patent and that said Letters Patent is hereby corrected as shown below:

On the Title Page

Item (12) "Linet et al." should read as -- Liret et al. --; and

Item (72) Inventors: "Anne Linet, London (GB)" should read as -- Anne Liret, London (GB) --.

In the Drawings

Sheet 2 of 2, FIG. 3, for Tag "404", Line 1, delete "VNF reployment plan" and insert -- VNF deployment plan --, therefor.

Signed and Sealed this
Third Day of January, 2023

Katherine Kelly Vidal
*Director of the United States Patent and Trademark Office*